US012232491B2

(12) United States Patent
Canada et al.

(10) Patent No.: US 12,232,491 B2
(45) Date of Patent: Feb. 25, 2025

(54) SEED COATING (71) Applicant: Milliken & Company, Spartanburg, SC (US)

(72) Inventors: Thomas A. Canada, Chesnee, SC (US); Dominick J. Valenti, Moore, SC (US); Walter P. Horton, Rutherfordton, NC (US); Robert L. Schuette, Woodruff, SC (US)

(73) Assignee: Milliken & Company, Spartanburg, SC (US)

( * ) Notice: Subject to any disclaimer, the term of this patent is extended or adjusted under 35 U.S.C. 154(b) by 89 days.

(21) Appl. No.: 17/580,770

(22) Filed: Jan. 21, 2022

(65) Prior Publication Data

US 2022/0256843 A1 Aug. 18, 2022

Related U.S. Application Data

(60) Provisional application No. 63/150,192, filed on Feb. 17, 2021.

(51) Int. Cl.
*A01N 25/10* (2006.01)
*A01C 1/06* (2006.01)
*C05G 5/40* (2020.01)

(52) U.S. Cl.
CPC ............... *A01N 25/10* (2013.01); *A01C 1/06* (2013.01); *C05G 5/40* (2020.02)

(58) Field of Classification Search
CPC ...... A01C 1/046; A01C 1/06; A01G 13/0262; A01G 24/23; A01N 25/10; C05G 5/30; C05G 5/37; C05G 5/40
USPC ........................................................ 504/100
See application file for complete search history.

(56) References Cited

U.S. PATENT DOCUMENTS

| | | | |
|---|---|---|---|
| 2,313,057 A | 3/1943 | Fischer | |
| 3,422,569 A | 1/1969 | Lyon | |
| 3,516,196 A | 6/1970 | Lippoldt | |
| 4,357,780 A | 11/1982 | Ball | |
| 5,245,785 A | 9/1993 | Taniguchi | |
| 6,349,499 B1 | 2/2002 | Spittle | |
| 6,745,513 B2 | 6/2004 | Krysiak | |
| 6,777,465 B2 | 8/2004 | Haile | |
| 6,800,712 B2 | 10/2004 | Doane | |
| 6,903,053 B2 | 6/2005 | Noda | |
| 7,009,020 B2 | 3/2006 | Doane | |
| 8,024,890 B2 | 9/2011 | Bertin | |
| 8,429,849 B2 | 4/2013 | Bertin | |
| 8,881,453 B2 | 11/2014 | Hendrickson | |
| 8,931,209 B2 | 1/2015 | Hendrickson | |
| 9,010,258 B1* | 4/2015 | Richard | A01C 7/082 111/179 |
| 9,386,737 B2 | 7/2016 | Choe | |
| 9,554,502 B2 | 1/2017 | Madsen | |
| 2006/0047068 A1 | 3/2006 | Doane | |
| 2006/0150489 A1 | 7/2006 | Legro | |
| 2006/0185235 A1 | 8/2006 | Bono | |
| 2010/0093535 A1 | 4/2010 | Rose | |
| 2010/0263274 A1 | 10/2010 | Corak | |
| 2012/0231171 A1 | 9/2012 | Roa-Espinosa | |
| 2012/0277099 A1 | 11/2012 | Olson | |
| 2014/0235438 A1 | 8/2014 | Thompson | |
| 2015/0096265 A1 | 4/2015 | Choe | |
| 2016/0029550 A1* | 2/2016 | Crivello | C05G 3/80 71/23 |
| 2016/0262317 A1 | 9/2016 | Scott-Harden | |
| 2016/0362345 A1 | 12/2016 | Lipscomb | |
| 2017/0127603 A1 | 5/2017 | Reus | |
| 2018/0077853 A1 | 3/2018 | Dashiell | |
| 2018/0208518 A1 | 7/2018 | Beaudoin Nadeau | |
| 2018/0251654 A1* | 9/2018 | Chen | C09D 105/04 |

FOREIGN PATENT DOCUMENTS

| | | |
|---|---|---|
| CA | 2839535 A1 | 7/2014 |
| CN | 1507773 A | 6/2004 |
| GB | 2376402 A | 12/2002 |
| WO | 2015110554 | 7/2015 |

OTHER PUBLICATIONS

International Search Report and Written Opinion issued in App. No. PCT/US2022/015052, mailing date May 25, 2022, 11 pages.

* cited by examiner

*Primary Examiner* — Zohreh A Fay
(74) *Attorney, Agent, or Firm* — Brenda D. Amidon (57) ABSTRACT

This invention relates to a coating for seeds comprising a polymeric material, a method of making and using the coating for improving the adherence of seeds to sloped surfaces, and seeds containing said coating. The invention also relates to a horticulture system for distributing the coated seeds to landscaping and/or agricultural surfaces.

7 Claims, 8 Drawing Sheets

SEED COATING

CROSS REFERENCE TO RELATED APPLICATIONS

This application claims priority to U.S. Provisional Patent Application No. 63/150,192, entitled "Seed Coating," which was filed on Feb. 17, 2021, and is entirely incorporated by reference herein.

TECHNICAL FIELD

This invention relates to a coating for seeds comprising a polymeric material, a method of making and using the coating for improving the adherence of seeds to sloped surfaces, and seeds containing said coating. The invention also relates to a horticulture system for distributing the coated seeds to landscaping and/or agricultural surfaces.

BACKGROUND

There is a need for improving the adherence of seeds on sloped surfaces where germination of plants (such as grass) is desired. Rain and wind often wash away seeds that have been applied to landscape surfaces, thereby preventing their ability to germinate in those areas, especially areas having to counteract the effects of gravity. The invention provided herein addresses this problem by providing a coating to horticulture material (such as seeds) that contains at least one polymeric material. The coating provides improved adherence of the horticulture material coated therewith to the ground surface. The coating provides a tacky surface to the seeds when moisture (such as rainwater or other watering mechanisms) contact the coated seeds. As a result, the coated seeds are less likely to wash away due to the effects of watering and/or or high wind events. Thus, improvements in adherence of seeds to landscaping and/or agricultural surfaces is achieved.

BRIEF SUMMARY

In one aspect, the invention relates to a horticulture system comprising a container, wherein said container holds a dry, shakable composition, said composition comprising (a) coated seed, wherein the coating comprises at least one polymeric material, and (b) at least one additional horticulture material.

DETAILED DESCRIPTION

The present invention described herein is a coating for seeds comprising at least one polymer that is applied in liquid form to the surface of the seeds. After application, the coating is dried and forms an insoluble coating to the seed surface. The coating becomes tacky when subjected to moisture thus improving the adherence of seeds to landscape ground surfaces. A horticulture system comprising the coated seeds and a container for distributing the coated seeds, and optionally at least one other horticulture material, is also included as part of the invention described herein.

"Horticulture material" as used herein is intended to include seeds (such as turf seeds), mulch (such as wood mulch, coconut wood fibers, and the like, and mixtures thereof), fertilizer material (such as fertilizer pellets), and the like, and mixtures thereof.

Suitable polymers comprising the coating include polyvinyl acetate, polyvinyl alcohol, sodium polyacrylate, starch, pectin, carboxymethylcellulose, and combinations thereof.

In a further aspect of the invention, the coating described herein may be applied to other materials useful in horticulture applications. For example, the coating may be applied to wood mulch and/or fertilizer pellets. These materials are often combined with seeds to aid in the germination process. Thus, the coating of the present invention may be applied to seeds, mulch (such as wood mulch, coconut fiber, and the like), fertilizer pellets, and combinations thereof. Descriptions of exemplary suitable horticulture materials that may be coating according to the present invention are provided in U.S. Pat. Nos. 8,024,890 and 8,429,849; in US Patent Application Publication Nos. 2006/0047068, 2010/0093535, and 2012/0277099; and in Canadian Patent No. 2839535.

In one aspect of the invention, the coating is first applied to the material (seed only or seed plus other horticulture materials) using the least amount of moisture necessary to obtain a substantially uniformly coated horticulture system. The material thus coated is then dried. By minimizing the amount of moisture utilized in the application process, it has been discovered that a free flowing (shakable, non-clumping) coated material is obtained. The coated material may then be applied to the ground surface by a consumer via a shaker can (such as a container having openings in the mouth of the container of a size capable of controlled distribution of the material contained therein). Thus, in one aspect of the invention, the container has a plethora of apertures, each aperture having a size sufficient to allow distribution of the composition and/or material from the container.

The horticulture system of the present invention contains a composition comprising coated seed and horticulture material. In one aspect of the invention, the moisture content of the composition may be less than 20% by weight, or even less than 15% by weight, or even less than 10% by weight. In another aspect of the invention, the moisture content of the composition may be in the range from 0.001% to 20% by weight, or even from 0.1% to 15% by weight, or even from 1% to 10% by weight. The ratio of coated seed to horticulture material may be present in the range from 1 to 4 to 4 to 1.

After application of the coated material to the intended surface for germination, the material is typically watered (a re-wet step). Upon watering, the coating of the present invention adheres the components of coated material together with a thin layer of polymer. In other words, after re-wetting the coated horticulture material, it is no longer a free-flowing product. This action of re-wetting provides the applied horticulture material with an improved resistance to being washed away due to rain fall and/or other heavy watering, and even wind. The components are adhered together with enough tacky force that they resist undesirable movement from the germination location.

EXAMPLES

The invention may be further understood by reference to the following examples which are not to be construed as limiting the scope of the present invention.

Slope Wash-Off Test

In order to evaluate the effectiveness of the present invention in improving adherence of horticulture material to a surface, a device was designed to mimic a sloped surface. The device allowed a test sample to be wetted, dried, and then re-wet. The re-wet step included subjecting the test sample to a water spray while being held at an angle. An angle of 27 degrees was used for testing the samples. Various sized nozzles and water pressures were evaluated so as to test the system over a variety of conditions. Three main test conditions were used:
  (1) Sprinkle—Low flow nozzle at 5 psig
  (2) Rain—Low flow nozzle at 10 psig, and
  (3) Tsunami—High flow nozzle at 30 psig.

Several samples were prepared and evaluated using the Slope Wash-Off Test. Test results are provided in Table 1. The samples were prepared by adding each liquid polymer option to the solid One Step Complete, a commercially available horticulture product from Pennington as follows:

A given weight of Pennington One Step Complete as is (83% wood crumble, 5% fertilizer pellet, and 12% of a fescue seed blend) was added to a seed coater. A description of the seed coater can be found in MDS Methods, "SOP for Aginnovation Rotary 12 Seed Coater." The liquid polymer was then added to the seed coater. The material was allowed to dry for a few seconds. The coated material was then dropped to bag.

The prill sample contained starch and sodium polyacrylate. The spray samples contained 50% active emulsified polyvinyl acetate. The measurement shown in Table 1 represents seconds needed for approximately 50% of the pre-conditioned (wetting and curing) patty to wash away under the wash off wetting conditions.

TABLE 1

Formulations Evaluated for Slope Wash-Off Test

| Sample | Sprinkle | Rain | Tsunami |
|---|---|---|---|
| One-Step (Control) | 1760 | 809 | 4 |
| One-Step + Prill Prototype @ 10% | 440 | 780 | 42 |
| One-Step + Spray Prototype @ 6% | 8148 | 2121 | 16 |
| One-Step + Spray Prototype @ 3.6% | 6230 | 3890 | 16 |
| One-Step + Spray Prototype @ 2.4% | 2632 | 684 | 7 |
| One-Step + Spray Prototype @ 1.2% | 472 | 315 | 4 |

$1^{st}$ Wet out the test sample (Tray Choice: 9"×7" Baking Sheets, Tray Alignment: 5 degrees from Horizontal, Ring Size: 3⅞" ID (4" OD), Sample: 15 grams, Nozzle: FL-5VC Brown, Nozzle Alignment: Perpendicular to Sample, V1: Nozzle Height From Sample: 1.5 inches, V2: Pressure: 5 psig, Technique: Spray for 3 sec every 60 sec for 5 min total, and V3: Time: 300 sec (5 min))

$2^{nd}$ Let Wood Crumbles Soak, Tray Alignment: Horizontal, V4: Time: 60 min, Change position to drain off excess water, Tray Alignment: 27 degrees, Let system Dry (Remove Wood Ring after 30 minutes): Tray Alignment: Horizontal, V5: Time: >12 hours, V6: Temperature: Record Start Dry: Mar. 18, 2020 13:45, V7: Relative Humidity: Record End Dry: Mar. 19, 2020 9:00 19.3 hours $3^{rd}$ Test Landslide: V8: Tray Alignment: 25 degrees, Nozzle: FL-15VC Green (Brown for time lapse video), V9: Nozzle Height from Sample: 1.5 inches, V10: Pressure: 30 psig, Result: Time: Measure to ½ Sample Landslide Test results illustrate that horticulture material coated individually with the following components—sodium polyacrylate, polyvinyl alcohol, starch, and sucrose—improved the mulch patty's "holding power" under extreme (tsunami) conditions but were actually worse under the milder (sprinkle) conditions. In addition, the results indicate that polyvinyl acetate (either homogenized or emulsified) can be employed such that the durability measurements of the mulch patty under these test conditions could be improved across the entirety of the testing range. The amount of durability given to the system appears to be a function of the amount of polyvinyl acetate applied.

The Figures are provided to illustrate the visual differences observed for samples prepared according to the present invention. The samples containing the seed coating of the present invention exhibit a glossy and/or shiny sheen which is apparent in the Figures. The "dry application method" refers to a method of applying the seed coating to a material followed by resting overnight; therefore, no additional water is added after application of the coating. The "pre-wet application method" refers to a method for applying the seed coating to a material, followed by resting overnight; and then, prior to use and/or further testing, additional water is added to the coated material to provide a wet surface.

Figure 1A:
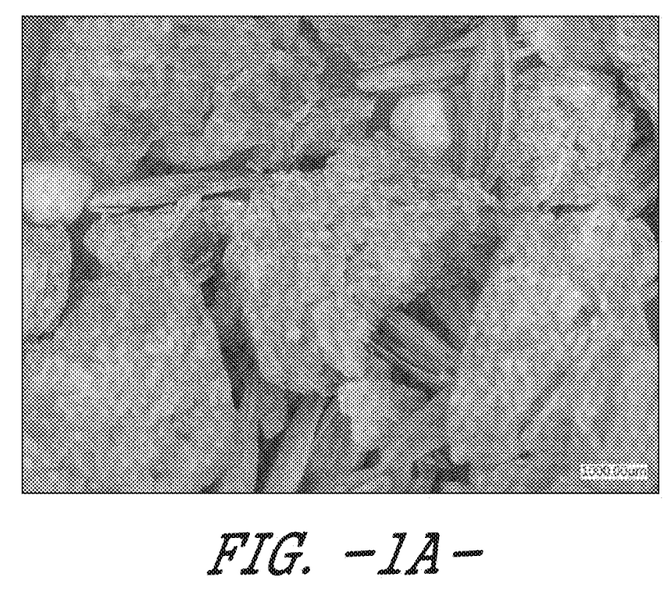
FIG. 1A is a photomicrograph at 20× magnification of the One Step commercial product without the seed coating of the present invention (the Control sample).
Figure 1B:
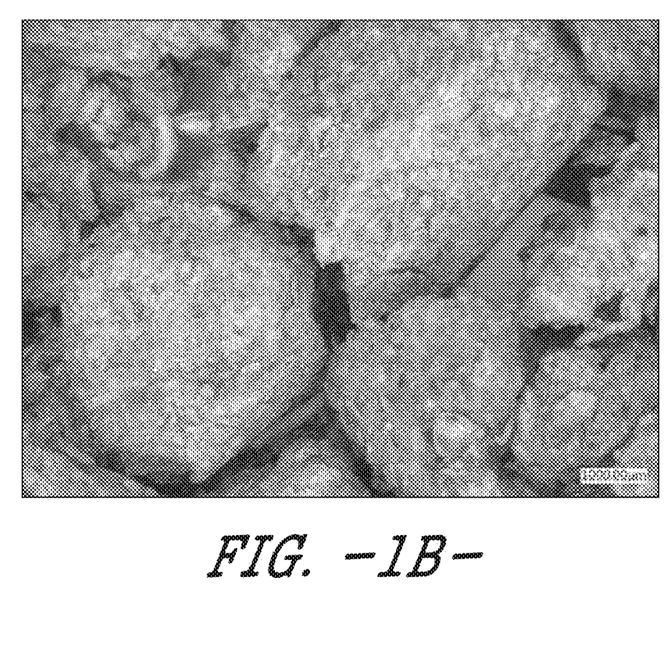
FIG. 1B is a photomicrograph at 20× magnification of the One Step product coated with 10% of the seed coating of the present invention using the dry application method.
Figure 1C:
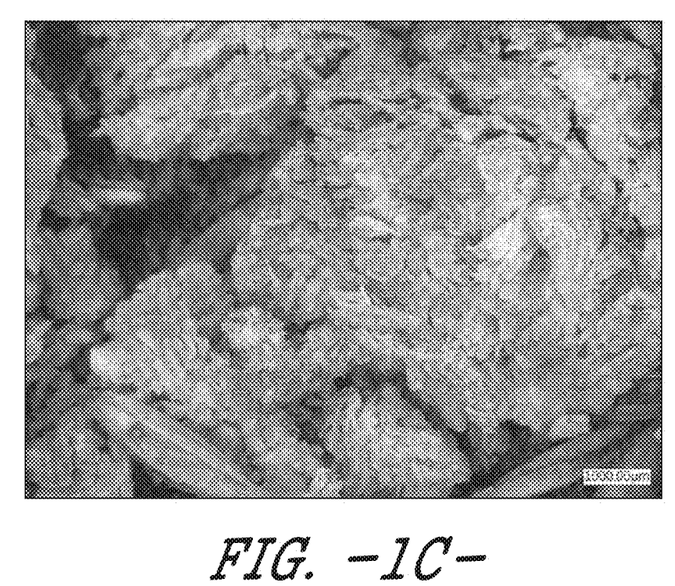
FIG. 1C is a photomicrograph at 20× magnification of the One Step product coated with 10% of the seed coating of the present invention using the pre-wet application method.
Figure 1D:
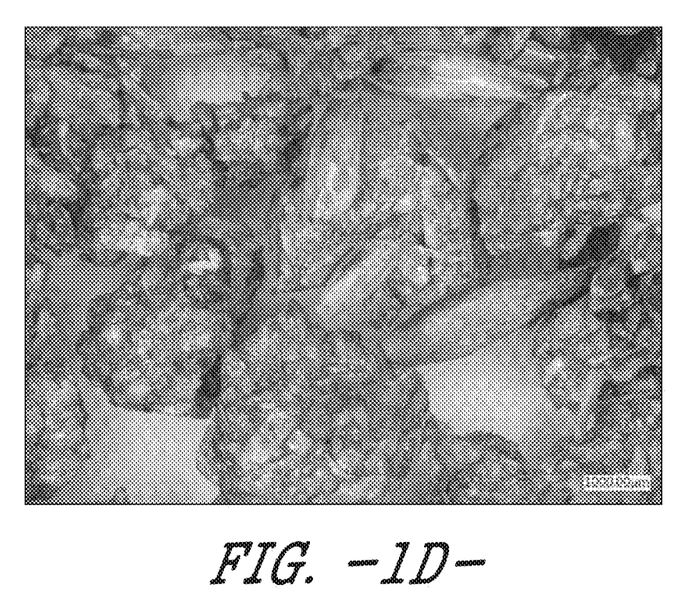
FIG. 1D is a photomicrograph at 20× magnification of the One Step product coated with 20% of the seed coating of the present invention using the dry application method.
Figure 1E:
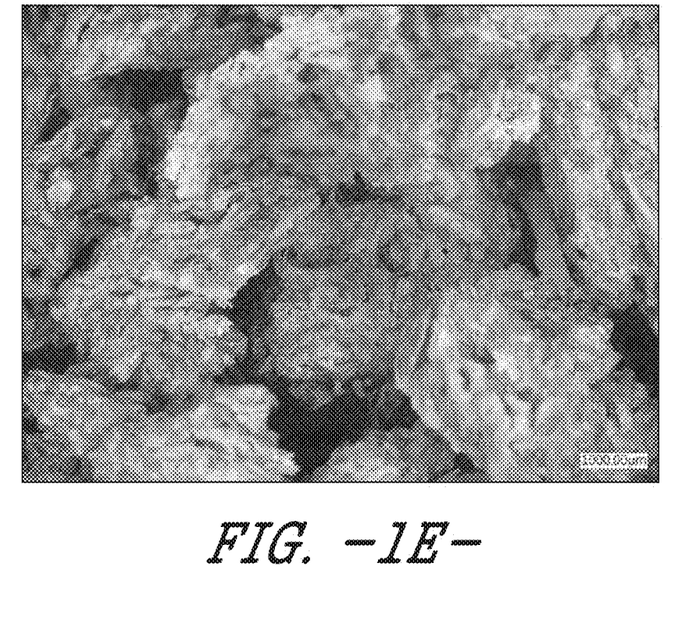
FIG. 1E is a photomicrograph at 20× magnification of the One Step product coated with 20% of the seed coating of the present invention using the pre-wet application method.

FIG. 1A is a photomicrograph at 20× magnification of the Pennington One Step Complete commercial product without the seed coating of the present invention (the Control sample). FIG. 1B is a photomicrograph at 20× magnification of the One Step product coated with 10% of the seed coating of the present invention using the dry application method. FIG. 1C is a photomicrograph at 20× magnification of the One Step product coated with 10% of the seed coating of the present invention using the pre-wet application method. FIG. 1D is a photomicrograph at 20× magnification of the One Step product coated with 20% of the seed coating of the present invention using the dry application method. FIG. 1E is a photomicrograph at 20× magnification of the One Step product coated with 20% of the seed coating of the present invention using the pre-wet application method.

Figure 2A:
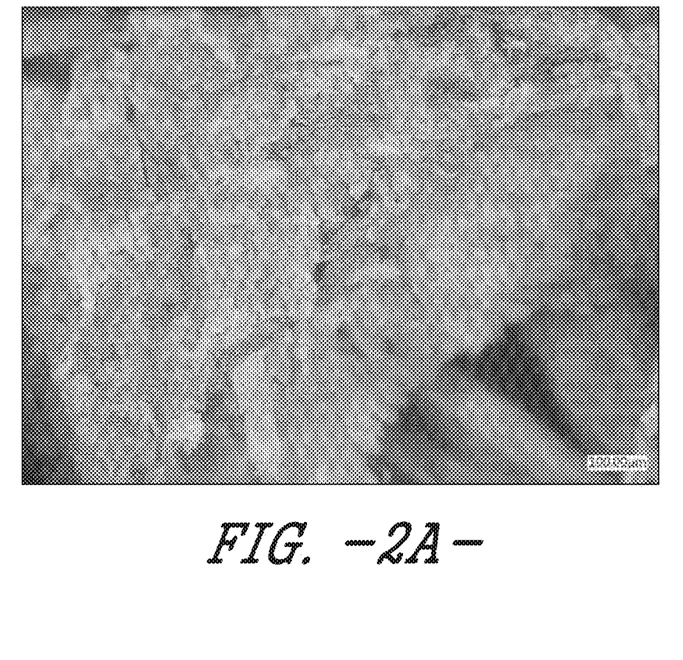
FIG. 2A is a photomicrograph at 50× magnification of the One Step commercial product without the seed coating of the present invention (the Control sample).
Figure 2B:
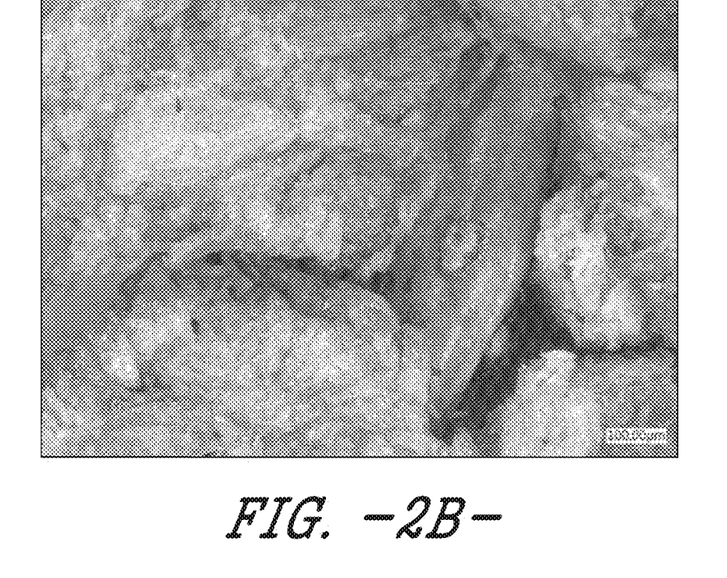
FIG. 2B is a photomicrograph at 50× magnification of the One Step product coated with 10% of the seed coating of the present invention using the dry application method.
Figure 2C:
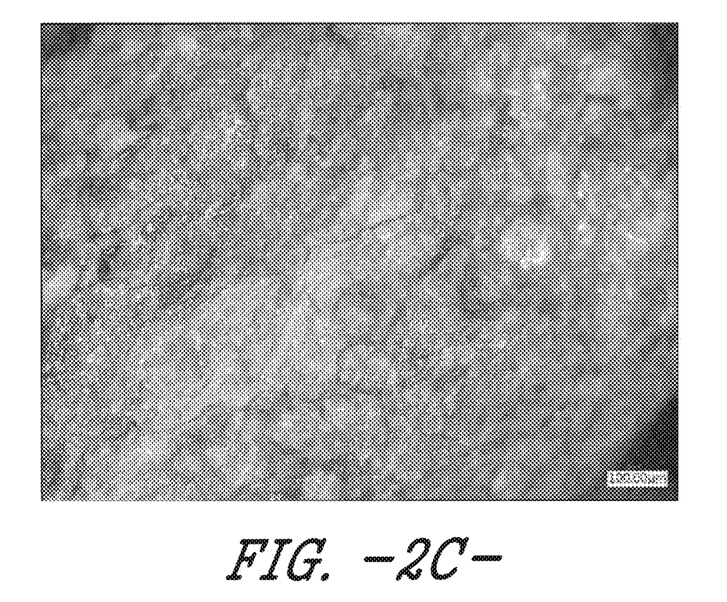
FIG. 2C is an alternate photomicrograph at 50× magnification of the One Step product coated with 10% of the seed coating of the present invention using the dry application method.
Figure 2D:
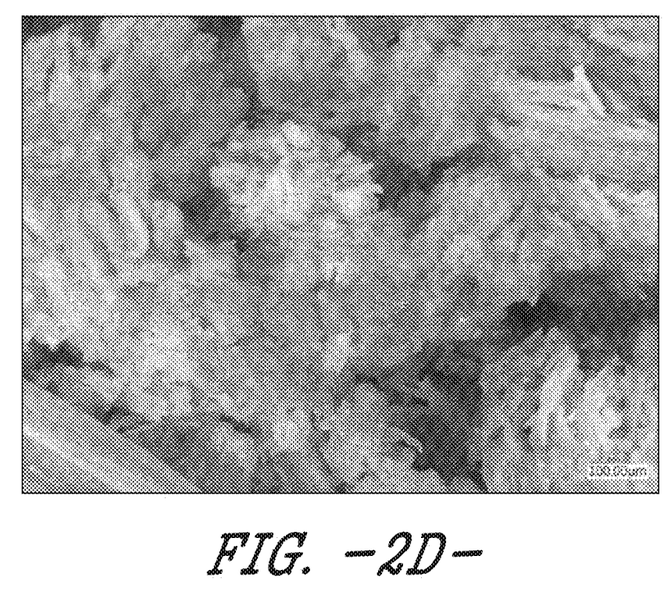
FIG. 2D is a photomicrograph at 50× magnification of the One Step product coated with 10% of the seed coating of the present invention using the pre-wet application method.
Figure 2E:
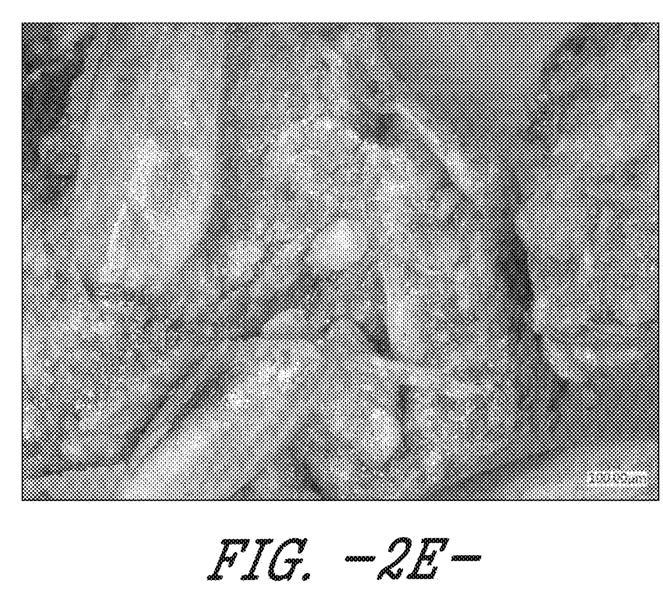
FIG. 2E is an alternate photomicrograph at 50× magnification of the One Step product coated with 20% of the seed coating of the present invention using the dry application method.
Figure 2F:
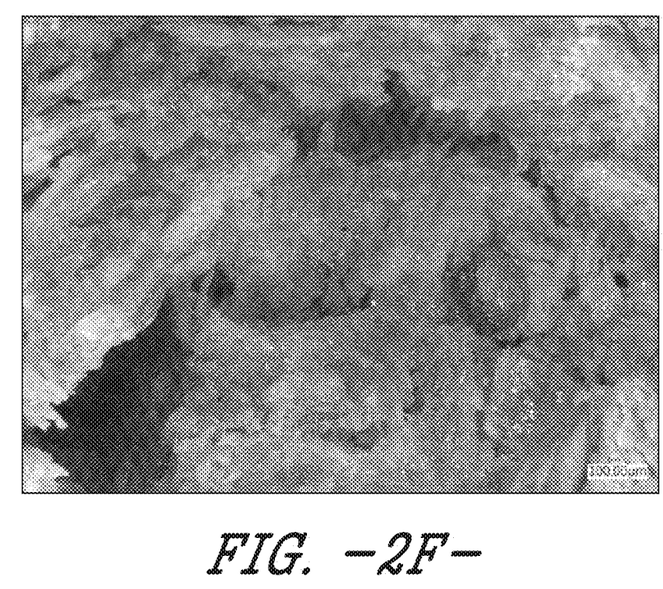
FIG. 2F is a photomicrograph at 50× magnification of the One Step product coated with 20% of the seed coating of the present invention using the pre-wet application method.

FIG. 2A is a photomicrograph at 50× magnification of the One Step commercial product without the seed coating of the present invention (the Control sample). FIG. 2B is a photomicrograph at 50× magnification of the One Step product coated with 10% of the seed coating of the present invention using the dry application method. FIG. 2C is an alternate photomicrograph at 50× magnification of the One Step product coated with 10% of the seed coating of the present invention using the dry application method. FIG. 2D is a photomicrograph at 50× magnification of the One Step product coated with 10% of the seed coating of the present invention using the pre-wet application method. FIG. 2E is an alternate photomicrograph at 50× magnification of the One Step product coated with 20% of the seed coating of the present invention using the dry application method. FIG. 2F is a photomicrograph at 50× magnification of the One Step product coated with 20% of the seed coating of the present invention using the pre-wet application method.

Figure 3A:
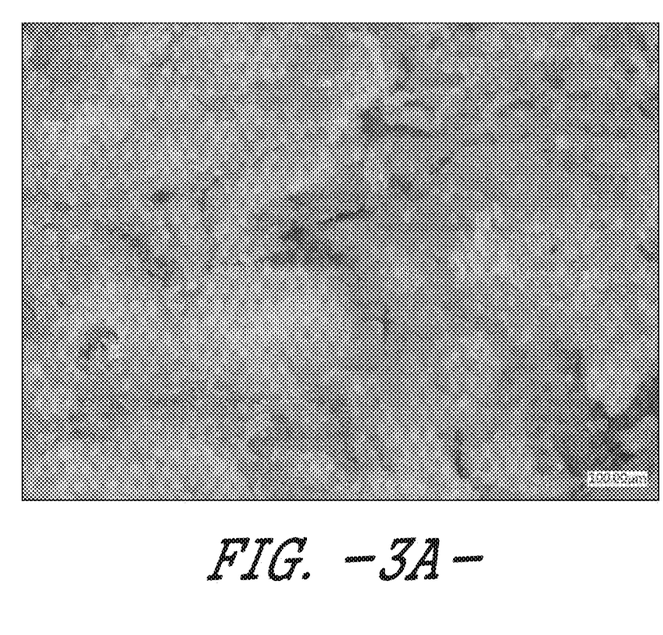
FIG. 3A is a photomicrograph at 200× magnification of the One Step commercial product without the seed coating of the present invention (the Control sample).
Figure 3B:
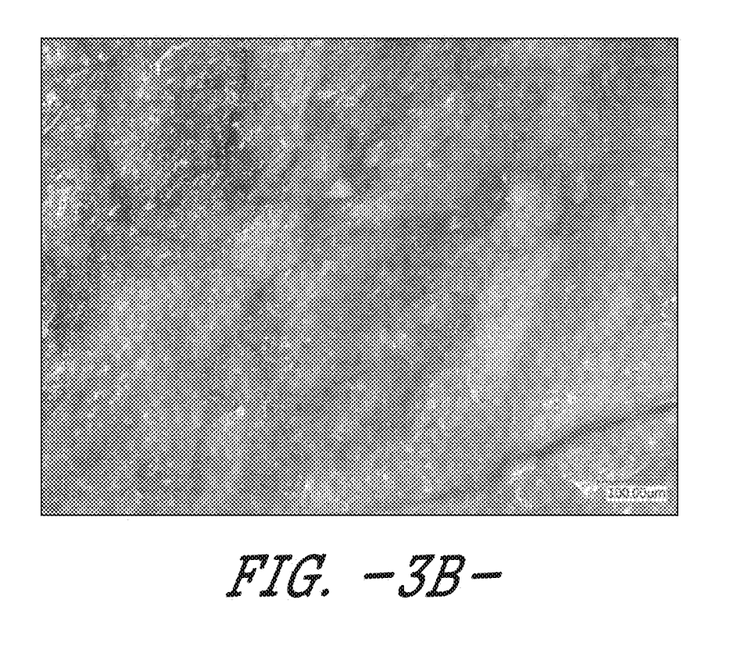
FIG. 3B is a photomicrograph at 200× magnification of the One Step product coated with 10% of the seed coating of the present invention using the dry application method.
Figure 3C:
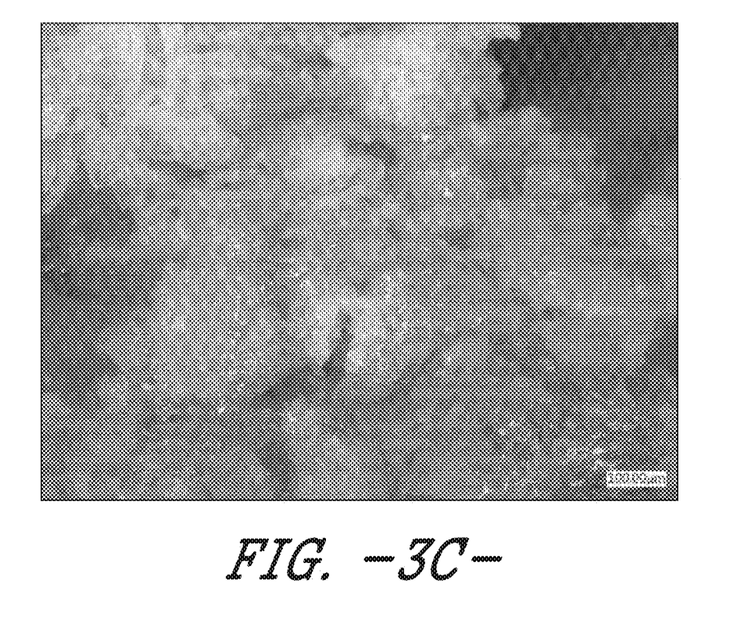
FIG. 3C is a photomicrograph at 200× magnification of the One Step product coated with 10% of the seed coating of the present invention using the pre-wet application method.
Figure 3D:
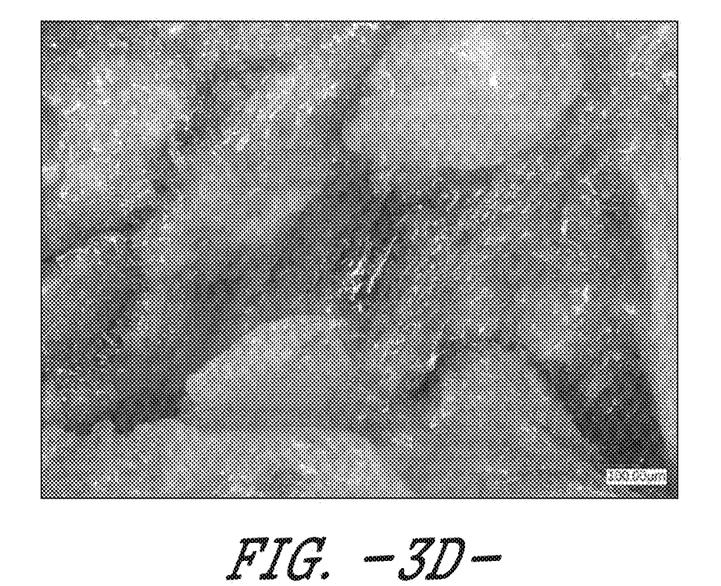
FIG. 3D is a photomicrograph at 200× magnification of the One Step product coated with 20% of the seed coating of the present invention using the dry application method.
Figure 3E:
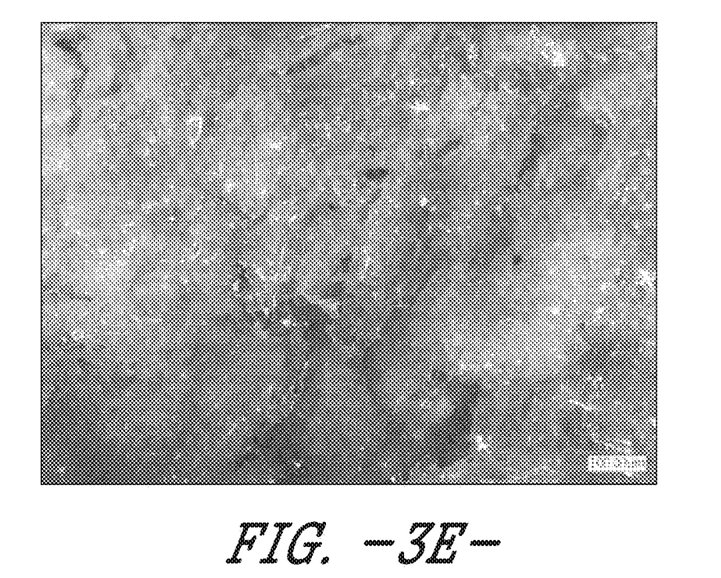
FIG. 3E is a photomicrograph at 200× magnification of the One Step product coated with 20% of the seed coating of the present invention using the pre-wet application method.

FIG. 3A is a photomicrograph at 200× magnification of the One Step commercial product without the seed coating of the present invention (the Control sample). FIG. 3B is a photomicrograph at 200× magnification of the One Step product coated with 10% of the seed coating of the present invention using the dry application method. FIG. 3C is a photomicrograph at 200× magnification of the One Step product coated with 10% of the seed coating of the present invention using the pre-wet application method. FIG. 3D is a photomicrograph at 200× magnification of the One Step product coated with 20% of the seed coating of the present invention using the dry application method. FIG. 3E is a photomicrograph at 200× magnification of the One Step product coated with 20% of the seed coating of the present invention using the pre-wet application method.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A horticulture system comprising a container, wherein said container holds a dry, shakable composition and wherein the container comprises a plethora of apertures, each aperture having a size sufficient to allow distribution of the composition from the container, said composition comprising (a) coated turf seed, wherein the coating comprises at least one polymeric material, and (b) at least one additional horticulture material.

2. The system of claim 1, wherein the at least one polymeric material is selected from the group consisting of polyvinyl acetate, polyvinyl alcohol, sodium polyacrylate, starch, pectin, carboxymethylcellulose, and combinations thereof.

3. The system of claim 1, wherein the at least one additional horticulture material is selected from the group consisting of seeds, mulch, fertilizer material, and mixtures thereof.

4. The system of claim 3, wherein mulch is selected from the group consisting of wood mulch, coconut wood fibers, and mixtures thereof.

5. The system of claim 3, wherein the fertilizer material is fertilizer pellets.

6. The system of claim 1, wherein the composition contains less than 20% moisture.

7. The system of claim 1, wherein the composition contains a ratio of coated seed to horticulture material in the range from 1 to 4 to 4 to 1.

* * * * *